(No Model.)
J. F. HULETT.
SEED PLANTER.
No. 477,369. Patented June 21, 1892.
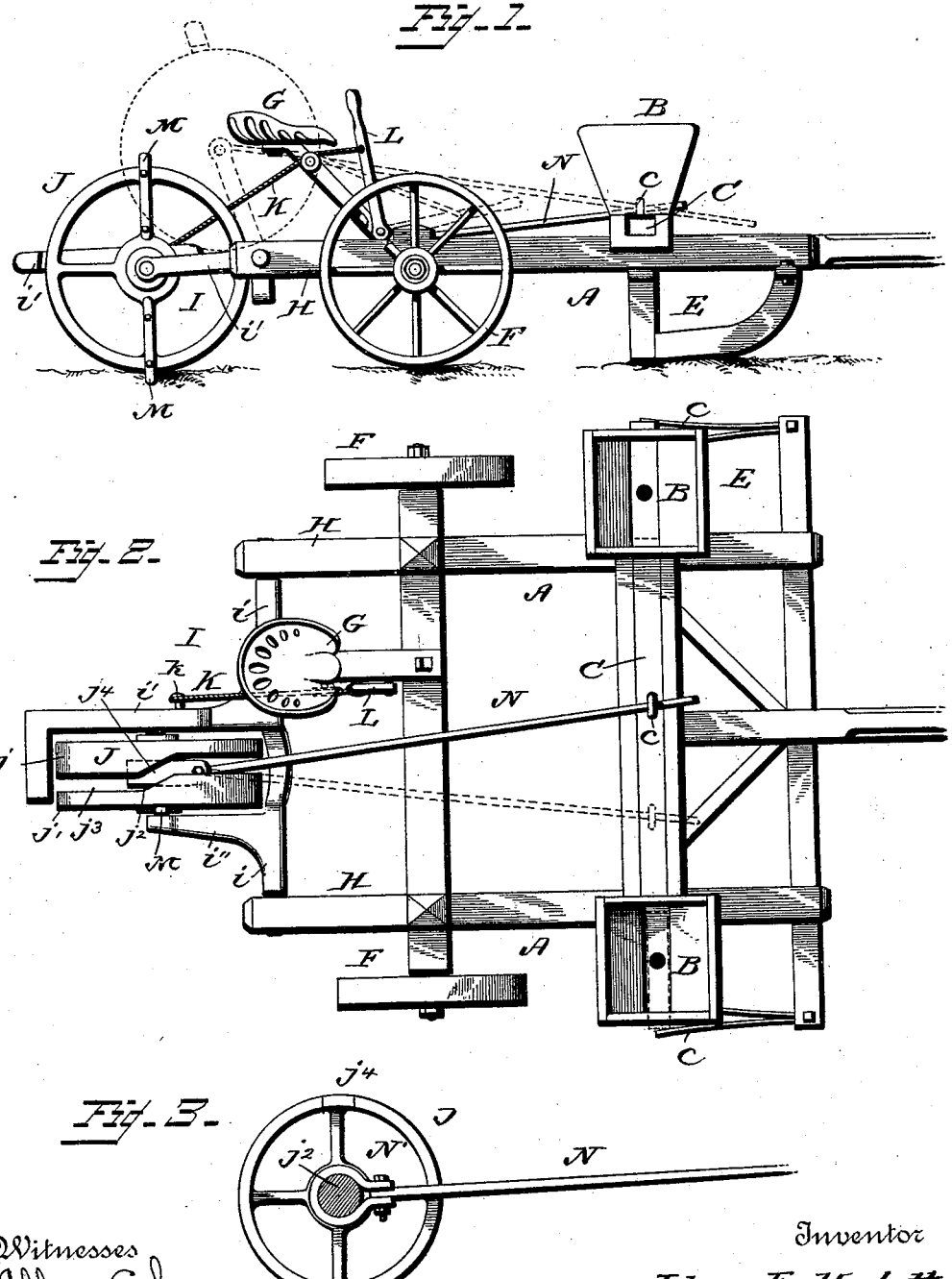
Witnesses
Albert Speiden
Balthus L. Long
Inventor
John F. Hulett,
By his Attorneys
Baldwin, Davidson & Wight

UNITED STATES PATENT OFFICE.

JOHN F. HULETT, OF EXCELSIOR SPRINGS, MISSOURI, ASSIGNOR OF ONE-HALF TO HIRAM GOULD, OF SAME PLACE.

SEED-PLANTER.

SPECIFICATION forming part of Letters Patent No. 477,369, dated June 21, 1892.

Application filed February 15, 1892. Serial No. 421,570. (No model.)

*To all whom it may concern:*

Be it known that I, JOHN F. HULETT, a citizen of the United States, residing at Excelsior Springs, in the county of Clay and State of Missouri, have invented certain new and useful Improvements in Seed-Planters, of which the following is a specification.

My invention relates especially to corn-planters wherein the grain is planted in hills equal distances apart and in regular rows without the use of check-row lines.

According to my invention I provide one or more, preferably two, seed-boxes, in the bottom of which works a slide operated by a cam-wheel normally resting on the ground and having two or more markers.

The details of my invention will be hereinafter more particularly described.

The accompanying drawings show so much of a grain-planter as is necessary to illustrate my invention.

In applying my invention to working machines the details of construction may of course be somewhat modified.

Figure 1 is a side elevation of the machine; Fig. 2, a plan view; and Fig. 3, a detail view of the cam-wheel, showing its connection with the slide-operating rod.

The main frame A may be of any approved construction. It is provided at its front end, as shown in the drawings, with two seed-boxes B, which have openings at their lower ends, and guides for a slide-bar C. The slide-bar is adapted to reciprocate transversely to the line of draft and to open and close the openings through which the seed drop and are deposited in the ground at the rear end of the runners E. Springs $c$ tend to hold the slide steady to close the openings. The carrying-wheels F may support the main frame in any suitable way, and the driver's seat G may be mounted and arranged in any usual or approved manner. The side beams H of the frame extend rearwardly from the axle, and in the rear ends of the side beams is pivoted a frame I, in which is journaled a cam-wheel J.

The frame, as shown, is formed with arms $i$ transverse to the line of draft, which are pivoted in the beams, and with arms $i'$, in which the axle of the cam-wheel is journaled. One of the arms is prolonged rearwardly and extended transversely behind the cam-wheel to act as a scraper therefor. A chain or rope K connects the frame at $k$ with a lever L within convenient reach of the driver. By moving the lever forwardly, as indicated by dotted lines, the cam-wheel may be lifted from the ground.

The cam-wheel J is of a novel construction. It is a skeleton wheel made of two principal parts—viz., the sides $j$ and $j'$—which are united by a common hub $j^2$. The sides are separated to form a cam-wheel slot $j^3$, having inclined portions $j^4$ on opposite sides of the wheel at the points indicated by the markers M. A slide-operating rod N is loosely connected to the feed-slide C at $c$ and extends through the slot in the cam-wheel and is pivotally connected to a clip N', in which the axle of the cam-wheel J is free to revolve. The organization is such, as will be apparent, that when the cam-wheel revolves the slide-operating rod N will be oscillated and will impart a corresponding reciprocation to the slide C and the corn or seed will be delivered from the seed-boxes. It is also apparent that the corn or seed is delivered at regular intervals, and thus may be planted in hills. There is an obvious advantage in having the rod N extend into the slot in the cam-wheel instead of being operated by cams on the outside of the cam-wheel. The rod cannot be oscillated by any accident. It can only be moved when operated by the inclined portions of the slot in the wheel, and this slot is always kept clean and free from dirt by the rod.

The markers M are movable and may be adjusted in any desired way. As the machine plants one row of seed the markers indicate the hills and form guides for planting the next row. After having planted one row of hills the cam-wheel should be elevated, as shown in Fig. 1, and the machine turned around and moved over the field in a parallel line, which may be indicated or guided by the depressions made by the markers, as before explained.

Two or more machines may be operated at the same time to plant a plurality of rows in parallel lines.

I claim as my invention—

1. The combination, substantially as set forth, of a seed-box, a reciprocating slide, a wheel mounted in a pivoted frame and resting on the ground, and a single rod extending into a cam-slot in the wheel and connected at its front end to the slide.

2. The combination of a seed-box, a reciprocating slide, a cam-wheel provided with two or more markers, a pivoted frame in which the cam-wheel is mounted, a scraper formed on the pivoted frame for the cam-wheel, and a rod extending through a slot in the cam-wheel and connected to the axis thereof, substantially as described.

In testimony whereof I have hereunto subscribed my name.

JOHN F. HULETT.

Witnesses:
J. A. LEABO,
J. D. THOMSON.